(12) United States Patent
Cochran et al.

(10) Patent No.: US 10,317,985 B2
(45) Date of Patent: Jun. 11, 2019

(54) SHUTDOWN OF COMPUTING DEVICES

(71) Applicant: HEWLETT PACKARD ENTERPRISE DEVELOPMENT LP, Houston, TX (US)

(72) Inventors: Charles W. Cochran, Spring, TX (US); Patrick Schoeller, Cypress, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 197 days.

(21) Appl. No.: 15/108,654

(22) PCT Filed: Jan. 29, 2014

(86) PCT No.: PCT/US2014/013506
§ 371 (c)(1),
(2) Date: Jun. 28, 2016

(87) PCT Pub. No.: WO2015/116048
PCT Pub. Date: Aug. 6, 2015

(65) Prior Publication Data
US 2016/0328010 A1 Nov. 10, 2016

(51) Int. Cl.
*G06F 1/26* (2006.01)
*G06F 1/28* (2006.01)
(Continued)

(52) U.S. Cl.
CPC ............ *G06F 1/3296* (2013.01); *G06F 1/26* (2013.01); *G06F 1/30* (2013.01); *G06F 9/442* (2013.01);
(Continued)

(58) Field of Classification Search
CPC ...... G06F 1/26; G06F 1/28; G06F 1/30; G06F 11/2015; G06F 1/3296; G06F 9/442; H02J 9/061
(Continued)

(56) References Cited

U.S. PATENT DOCUMENTS 5,511,204 A 4/1996 Crump et al.
6,453,423 B1 9/2002 Loison
(Continued)

FOREIGN PATENT DOCUMENTS

| CN | 101895414 | 11/2010 |
| EP | 0797137 | 9/1997 |
| JP | 07-129285 | 5/1995 |

OTHER PUBLICATIONS

Sturdevant, C.; "Eaton UPS Safely Protects Systems with Graceful Shutdown"; Nov. 29, 2010; 2 pages.
(Continued)

*Primary Examiner* — Ji H Bae
(74) *Attorney, Agent, or Firm* — Hewlett Packard Enterprise Patent Department

(57) ABSTRACT

Examples for shutdown of computing devices (202) are described In an example, a shutdown event based on a shutdown criterion may be detected The shutdown criterion may be based on available power of an auxiliary power supply unit (304, 312) In response to detection of the shutdown event, a shutdown trigger to initiate shutdown of a computing device (202) powered by the auxiliary power supply unit (304, 312) may be generated. Further, the shutdown trigger may be provided to a remote management processor (218) of the computing device (202). The shutdown trigger may be provided based on port data (214), which indicates an outlet path from the auxiliary power supply unit (304, 312) to the at least one computing device.

17 Claims, 7 Drawing Sheets

(51) Int. Cl.
*G06F 1/30* (2006.01)
*G06F 1/32* (2006.01)
*H02J 9/06* (2006.01)
*G06F 11/20* (2006.01)
*G06F 9/4401* (2018.01)
*G06F 1/3296* (2019.01)

(52) U.S. Cl.
CPC ............... *H02J 9/061* (2013.01); *G06F 1/28* (2013.01); *G06F 11/2015* (2013.01)

(58) Field of Classification Search
USPC ............ 713/300, 320, 340; 714/14, 24
See application file for complete search history.

(56) References Cited

U.S. PATENT DOCUMENTS

| | | | |
|---|---|---|---|
| 6,657,534 B1* | 12/2003 | Beer | G06F 1/3209 340/3.1 |
| 7,296,172 B2 | 11/2007 | Hsu et al. | |
| 7,900,087 B2 | 3/2011 | Egan et al. | |
| 7,917,792 B2 | 3/2011 | Brech et al. | |
| 8,305,737 B2 | 11/2012 | Ewing et al. | |
| 2005/0283624 A1* | 12/2005 | Kumar | G06F 1/3203 713/300 |
| 2006/0161794 A1* | 7/2006 | Chiasson | G06F 1/28 713/300 |
| 2007/0118771 A1* | 5/2007 | Bolan | G06F 1/263 713/300 |
| 2008/0270971 A1 | 10/2008 | Agrawal et al. | |
| 2009/0113104 A1 | 4/2009 | Wenstand et al. | |
| 2009/0307512 A1* | 12/2009 | Munjal | G06F 1/30 713/324 |
| 2009/0307513 A1* | 12/2009 | Kinouchi | G06F 1/26 713/324 |
| 2010/0106987 A1* | 4/2010 | Lambert | G06F 1/3203 713/320 |
| 2013/0061214 A1 | 3/2013 | Jagatheesan et al. | |
| 2014/0029040 A1* | 1/2014 | Tsuji | H04N 1/00339 358/1.14 |
| 2017/0012842 A1* | 1/2017 | Kao | G06F 11/3058 |

OTHER PUBLICATIONS

International Searching Authority, The International Search Report and the Written Opinion, dated Oct. 27, 2014, 10 Pages.
TechnoPlanet, "Infrastructure Sizing Solutions", available online at <http://www.technoplanetenterprise.com/infrastructure/infrastructure-sizing-solutionst>, retrieved on Nov. 28, 2018, 3 pages.
Premathas Somasekaram, "Evaluation and Analysis of Hardware Sizing for a Mission Critical Enterprise Application", Independent thesis Basic level, Department of Computer Science, Linnaeus University, Sep. 2013, 54 pages.
International Preliminary Report on Patentability received for PCT Application No. PCT1US20141013506, dated Aug. 11, 2016, 7 pages.
IBM, "Checking Hardware Configuration and Settings", available online at <https://www.ibm.com/support/knowledgecenter/SSAW57_8.5.5/com.ibm.websphere.nd.multiplatform.doc/ae/tprf_tunehdwcap.html>, Last updated on Aug. 17, 2018, 9 pages.
Anderson et al., "Quickly finding near-optimal storage designs", ACM Transactions on Computer Systems (TOCS), vol. 23, Nov. 2005, 34 pages.
Hewlett-Packard Development Company L.P., "Systems management based solutions using ILO", Part No. 588708-001, Mar. 2010, 111 pages.
"Cloudmaps", Technical white paper, available online at <https://support.hpe.com/hpsc/doc/public/display?docId=emr_na-c03482833>, Sep. 2012, 17 pages.

* cited by examiner

US 10,317,985 B2

SHUTDOWN OF COMPUTING DEVICES

BACKGROUND

With the recent advances in technology, computing devices have become virtually ubiquitous in many ways. Individuals and organizations are increasingly dependent on computing facilities to perform various tasks. To ensure integrity of data and for smooth functioning of the computing devices, an uninterruptible power supply (UPS) unit, which allows continued activity in the computing devices, is coupled to each of the computing devices. A UPS unit typically provides almost instantaneous protection from input power interruptions by supplying energy stored in batteries. For example, in case an input power supply of a computing device fails, the coupled UPS unit may provide the back-up power to allow the user to enable graceful shutdown of the computing device.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
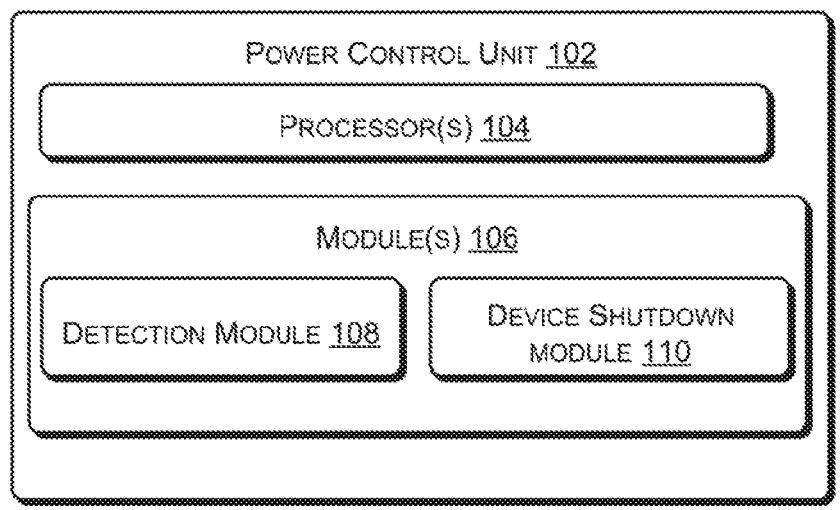
FIG. 1 illustrates a power control device, according to an example of the present subject matter.

Generally, computing devices are coupled to an uninterruptable power supply unit (UPS) for power backup, in the event of a power disruption. The UPS units typically store energy in a series of batteries that may power the computing devices in case of power outage or other power line disturbances.

The computing devices in turn may include one or more UPS agents, which are installed to monitor and communicate with the UPS unit. In operation, a UPS agent aids in establishing a network communication between the computing device and the UPS unit to relay the status of the UPS state to the computing device. Accordingly, the UPS agent may monitor the remaining power backup available with the UPS unit. Depending on the power backup available, the UPS agent may communicate to an operating system of the corresponding computing device to perform a controlled shutdown. This would allow the computing device to complete the pending tasks for execution before the computing device is powered down. During such a case, the UPS agent may further prevent accepting new requests and/or connections.

Since the UPS agents are installed and executed on the computing devices, such agents may be developed individually for different operating systems. Consequently, maintenance of the UPS agents may require installing updates, which again, have to be developed separately for different types of operating systems. Thus, with the availability of a wide variety of operating systems and with each operating system having various versions, multiple UPS agents are developed and maintained. Furthermore, it may also be the case that each time a new version of an operating system is launched, a corresponding UPS agent is to be developed, installed, and added to the maintenance load.

The UPS agents may communicate to the computing devices coupled to the UPS, through different communication channels. For example, in certain cases, a universal serial bus (USB) or RS 232 connection may be used for communication of the UPS agent on the computing device with the UPS unit. For network connected implementations, the UPS agents may communicate using certain administrative credentials and IP address(es) of the computing devices. Also, the manner in which the communication is to be affected between the UPS agent and the UPS may also be considered while developing and maintaining such UPS agents for each supported operating system.

Systems and methods for controlling shutdown of computing devices coupled to an auxiliary power supply unit are described. An auxiliary power supply may be any backup power system, such as but not limited to, an UPS, fly wheel energy storage system, photo voltaic power system, wind power system, or a power generator. The auxiliary power supply unit may include, in addition to a main back-up power source, one or more redundant power sources, which may power the computing devices in case the main back-up power source fails. Further, the power control unit may be implemented in, for example, the auxiliary power supply unit, a power distribution unit associated with the auxiliary power supply unit, or a combination thereof. In an example, a power control unit may control the shutting down of the computing devices, based on available power backup of the auxiliary power supply unit. The power control unit may monitor available power backup of the auxiliary power supply unit and may ascertain whether a shutdown criterion is satisfied. When it is ascertained that shutdown criteria is satisfied, a shutdown event is said to have occurred. On the occurrence of the shutdown event, the power control unit may initiate powering down or shutting down the associated computing devices. In one example, the shutdown criteria may specify a threshold level of power backup available. As another example, it should be noted that the threshold power backup level may be different for different events and for different implementations.

In an example, on detection of the shutdown event, one or more computing devices, powered by the auxiliary power supply unit, may be identified, based on identification data. The identification data may include at least one of downstream devices information and priority data. Generally, the auxiliary power supply unit may be coupled to one or more computing devices through intermediate power devices, such as power distribution units and extension bars. The downstream devices information may provide information pertaining to devices, such as the computing devices and/or intermediate power devices associated with the auxiliary power supply unit. Further, in an example, the identification rules may aid identification of the computing devices coupled to the auxiliary power supply unit, using downstream devices information. In other examples, the priority data may aid identification of computing devices tagged as low priority devices so that high priority devices may run for longer durations.

On identifying the computing devices to be shutdown, a shutdown trigger may be provided to the identified computing devices, based on port data. The port data may include information representing to which port of a device another device is coupled. For instance, to which outlet of a power distribution unit an intermediate power device is coupled and to which outlet of the intermediate power device a given computing device is coupled. In another example, the port data may indicate the ports to which power distribution units or other intermediate power devices are coupled. Thus, the port data may be used to determine an outlet path from the auxiliary power supply unit to a computing device in terms of ports to which the various devices are coupled.

Further, in an example, a shutdown trigger may include the outlet path and the shutdown trigger may be provided to the identified computing devices, based on the outlet path. In other words, the shutdown trigger may be provided to each of the identified computing devices through the ports indicated in the outlet path. In an example, the shutdown trigger is provided to each of the identified computing devices using a serial line communication or a power line communication. The shutdown trigger may indicate to an operating system of the computing device to perform a controlled shutdown.

In an example, the shutdown trigger may be provided to a remote management processor of each of the identified computing devices. A remote management processor may be understood as a separate internal processor, which operates independent of a computing device's main processor and/or an operating system. The remote management processor may in turn command the operating system to shutdown the corresponding computing device. Accordingly, on receiving the shutdown trigger, the identified computing devices may save data under processing and may subsequently shutdown, thereby maintaining data integrity.

Thus, the computing devices may not install and manage UPS agents as shutdown events may be controlled by a power control unit. Further in case of multiple computing devices being powered by a single UPS unit, instead of each computing device monitoring the UPS and controlling the shutdown using the corresponding UPS agents installed in the respective computing devices, a power control unit may control the shutting down of the computing devices connected to the power control unit, thereby providing for reduction in computational time and resources, in addition to providing for reduction in costs associated with UPS agents. Moreover, since, the shutdown trigger is not dependent on an operating system being used by the computing device, new UPS agents may not be developed and maintained, which in turn may further provide for reduction in development and maintenance costs. Also, since existing power supply units or power distribution units may be configured to function as a power control unit, no new devices may be added.

Additionally, since the shutdown of a computing device may be based on outlet port addresses, which are already available with the power control unit, therefore other credentials, such as administrative credentials or IP addresses of the identified computing devices may not be used for enabling the controlled shutdown. Further, such a point-to-point connection may provide for better protection against spoofing attacks, thereby minimizing the chances of a computing device being erroneously shutdown.

The above systems and methods are further described in the figures and associated description below. It should be noted that the description and figures merely illustrate the principles of the present subject matter. It will thus be appreciated that various arrangements that embody the principles of the present subject matter, although not explicitly described or shown herein, can be devised from the description and are included within its scope.

FIG. 1 illustrates a power control unit 102, according to an embodiment of the present subject matter. The power control unit 102 may be coupled to one or more computing devices (shown in FIG. 2) and to an auxiliary power supply unit (shown in FIG. 3) providing auxiliary power to the computing devices. In an example, the power control unit 102 may be implemented in the auxiliary power supply unit or a power distribution unit associated with an auxiliary power supply unit.

The power control unit 102 may include, for example, a processor 104 and modules 106 communicatively coupled to the processor 104. The processor 104 may include microprocessors, microcomputers, microcontrollers, digital signal processors, central processing units, state machines, logic circuitries and/or any other devices that manipulate signals and data based on computer-readable instructions.

Further, functions of the various elements shown in the figures, including any functional blocks labeled as "processor(s)", may be provided through the use of dedicated hardware as well as hardware capable of executing computer-readable instructions.

The modules 106, amongst other things, include routines, programs, objects, components, and data structures, which perform particular tasks or implement particular abstract data types. The modules 106 may also be implemented as, signal processor(s), state machine(s), logic circuitries, and/or any other device or component that manipulates signals based on operational instructions. Further, the modules 106 can be implemented by hardware, by computer-readable instructions executed by a processing unit, or by a combination thereof.

In one example, the modules 106 include a detection module 108 and a device shutdown module 110. In an example, the detection module 108 ascertains whether a shutdown criterion is satisfied. The shutdown criterion being based on available backup power of the auxiliary power supply unit. It will be understood that the available backup power may be determined based on power backup available with a back-up power source and one or more associated redundant power supply units, if present. On ascertaining that the shutdown criterion is satisfied, a shutdown event may be detected. In response to detection, at least one computing device, managed by the power control unit 102, may be identified. The computing device may be identified based on identification data. Further, the device shutdown module 110 may provide a shutdown trigger to the identified computing device. The shutdown trigger may be provided based on port data. Further, the shutdown trigger may include output addresses of one or more downstream devices, the one more downstream devices including the at least one computing device. The shutdown trigger may be communicated over a serial data path in parallel with an attached power line or using power line carrier data communications. In an example, the shutdown trigger may be directly provided to a computing device to be shutdown. In other examples, the shutdown trigger may be provided to one or more intermediate power devices, such as power distribution units. The various components of the power control unit 102 are described in detail in conjunction with FIGS. 2 and 3a-3c.

Figure 2:
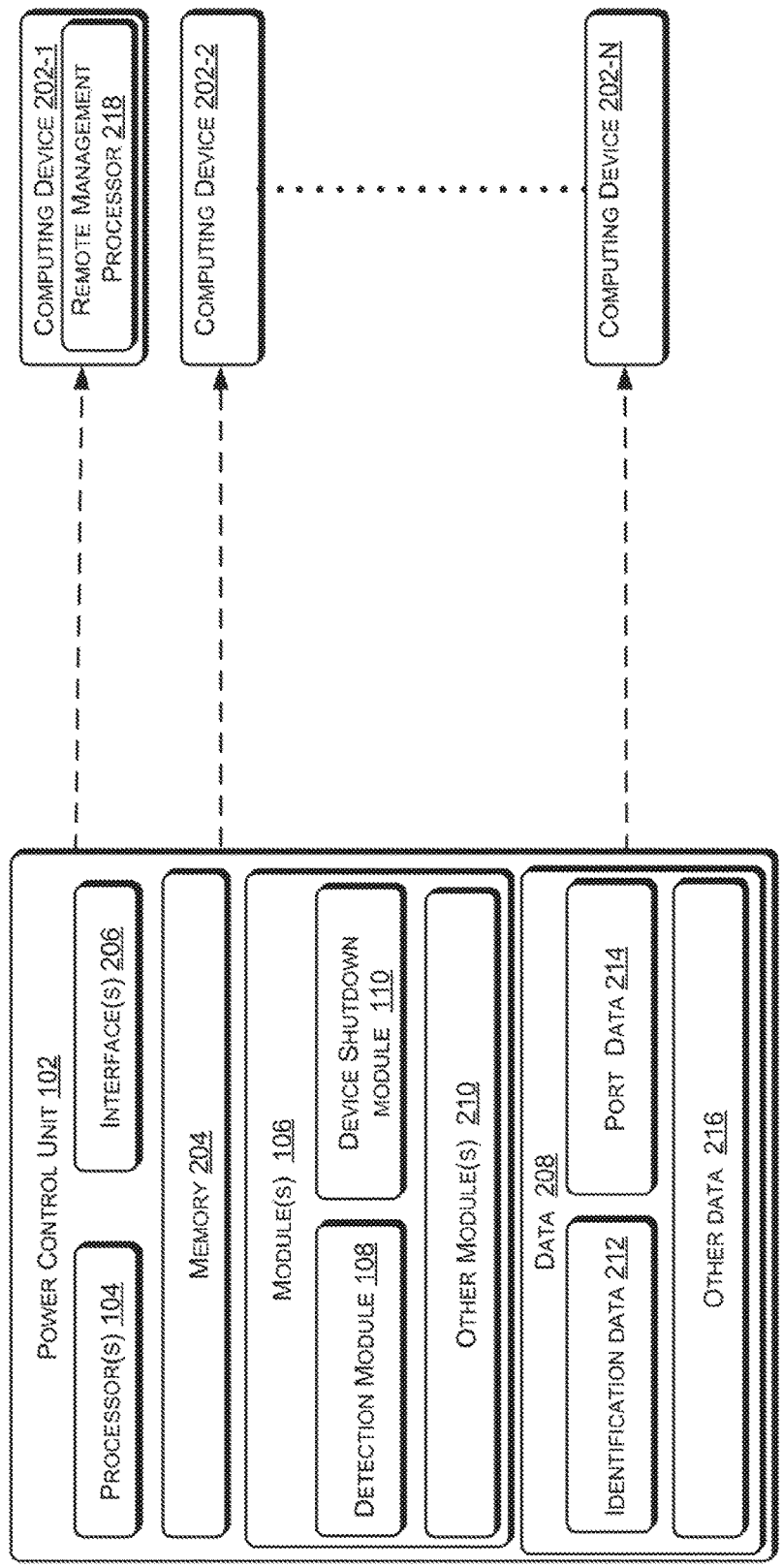
FIG. 2 illustrates various components of a power control device, according to an example of the present subject matter.

FIG. 2 illustrates various components of the power control unit 102, according to an example of the present subject matter. As illustrated, the power control unit 102 may be coupled to one or more computing devices 202-1, 202-2, . . . and 202-N, collectively referred to as computing device(s) 202. Examples of computing device 202 include, but are not limited to, servers, storage devices, workstations, personal computers, laptops, and other computing devices. The power control unit 102 may be coupled to the computing devices 202 using, for example, serial communication lines, such as RS 232 connections, and power line communication lines. Thus, communication between the power control unit 102 and the computing devices 202 may be using serial communication or power line communication. The computing devices 202 may be provided auxiliary power by an auxiliary power supply unit. The auxiliary power supply unit may include, for instance, an uninterruptable power supply unit or a generator. Further, based on an end use, the auxiliary power supply unit may include a main power backup and one or more redundant power sources.

As will be understood, the auxiliary power supply unit may provide back-up power to the computing devices 202. For instance, in case a main input power supply to the computing device 202 fails, the auxiliary power supply unit may provide near instantaneous power for smooth functioning of the computing device. However, the auxiliary power supply unit may itself have a limited battery life, which may discharge subsequently, before the main power supply is fixed. In such cases, for data integrity, controlled shutdown of the computing devices 202 may be performed.

Figure 3A:
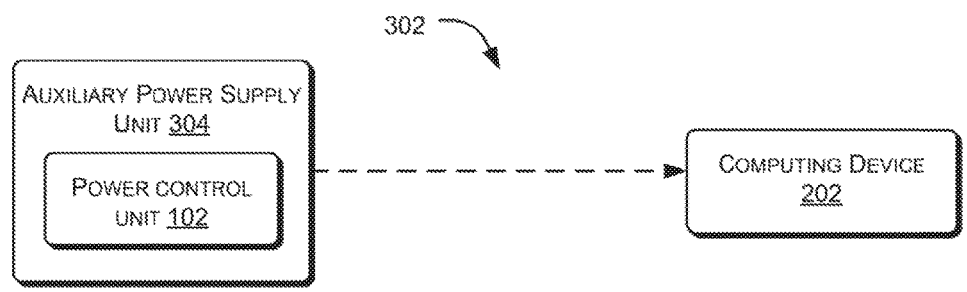
FIGS. 3a, 3b, and 3c illustrate the power control unit coupled to various downstream devices, according to various examples of the present subject matter.
Figure 3B:
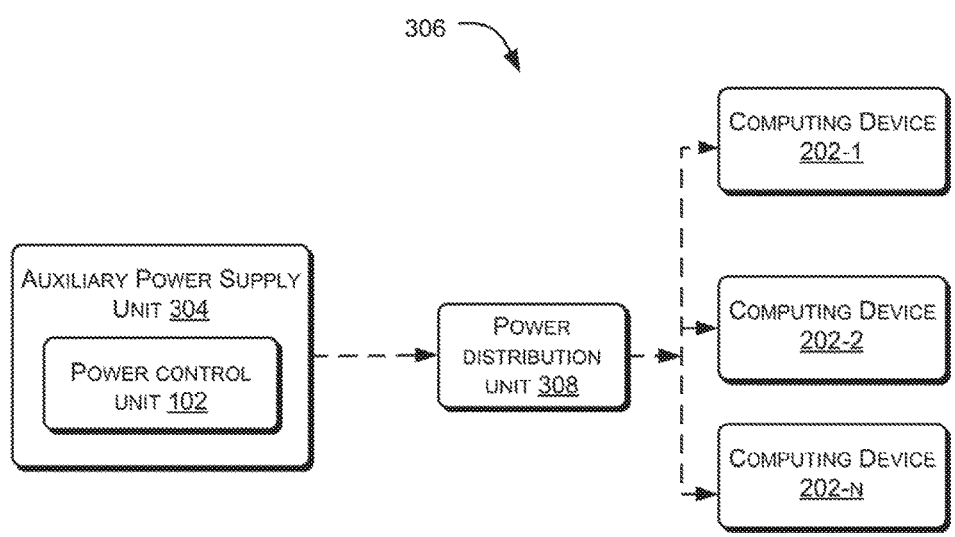
Figure 3C:
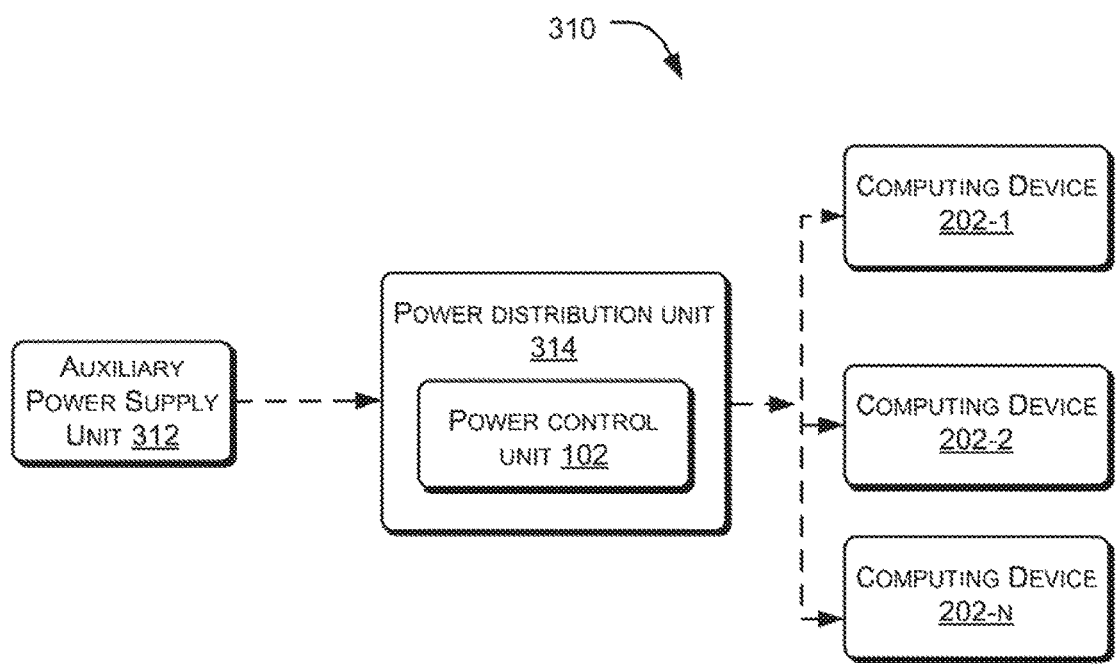

In an example, the controlled shutdown of the computing devices 202 may be performed by the power control unit 102. The power control unit 102 may be implemented in the auxiliary power supply unit as illustrated in FIGS. 3a and 3b. In another example, the power control unit 102 may be implemented in a power distribution unit as illustrated in FIG. 3c. Further, in other examples, the functionality of the power control unit 102 may be distributed between the auxiliary power supply unit and the power distribution unit.

The power control unit 102, among other things, may include the processor 104, modules 106, a memory 204, interface(s) 206, and data 208. The processor 104, among other capabilities, may fetch and execute computer-readable instructions stored in the memory 204. The memory 204, communicatively coupled to the processor 104, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The interfaces 206 may include a variety of commercially available interfaces, for example, interfaces for peripheral device(s), such as data input output devices, referred to as I/O devices, storage devices, network devices, and intermediate power devices. The interfaces 206 may facilitate multiple communications within a wide variety of networks and protocol types, including wired networks and wireless networks.

As mentioned earlier, the power control unit 102 may include the modules 106. In an example, the modules 106 include the detection module 108, device shutdown module 110, and other module(s) 210. The other module(s) 210 may include computer-readable instructions that supplement applications or functions performed by the power control unit 102.

Further, the data 208 includes identification data 212, port data 214, and other data 216. The other data 216 may include data generated and saved by the modules 106 for providing various functionalities of the power control unit 102.

In an example, the detection module 108 may monitor the auxiliary power supply unit to determine power available for consumption by the computing devices 202. Based on the monitoring, the detection module 108 may detect a shutdown event. The shutdown event may be based on available backup power of the auxiliary power supply unit. However, in certain cases, before the power from a main power supply is restored, the power available with the auxiliary power supply unit may exhaust and the computing devices 202 may have to be shutdown in an orderly manner to maintain integrity. It will be understood that, in the case where the auxiliary power supply unit includes the redundant power sources, the backup power available with the redundant power sources is also considered. For instance, in case a solar or wind power source has insufficient power due to environmental conditions, the available back-up power may be determined based on whether the redundant utility power is available or has failed.

Accordingly, in an example, the shutdown event may be detected when the available backup power of the auxiliary power supply unit is nearly exhausted but is enough to perform an orderly shutdown of the computing devices 202. In another example, the shutdown event may be detected when load shedding is to be performed. The load shedding may be performed by shutting down low priority devices so that high priority devices can run for a longer duration.

Accordingly, the detection module 108 may continuously or periodically monitor the auxiliary power supply unit and based on a shutdown criterion, the shutdown event may be detected. The shutdown criterion may be based on the available backup power of the auxiliary power supply unit. In an example, the shutdown criterion may indicate that a shutdown event has occurred if the available power of the auxiliary power supply unit goes below a threshold level. Further, it will be appreciated that the threshold power for a case where load shedding is to be performed may be different from a case where complete shutdown is to be performed, i.e., when the available backup power of the auxiliary power supply unit is nearly exhausted.

Upon detecting a shutdown event, the detection module 108 may identify at least one computing device 202 to be shutdown, based on the identification data 212. The identification data 212 may include one or more of the shutdown criterion, downstream device information, priority data, and the identification rules. The downstream information may include information pertaining to all devices, computing or other intermediate power devices, coupled to the auxiliary power supply unit. For instance, the downstream information may include details pertaining to the computing devices coupled to the auxiliary power supply unit through which intermediate power devices.

Further, the priority data may include a list of computing devices tagged as low priority devices and a list of computing devices tagged as high priority devices. The high priority devices may be understood to be computing devices that are central to a process, while low priority devices may be the computing devices which, when powered off, may not substantially affect the process. Accordingly, in case of load shedding, the low priority devices may be powered off first to ensure that the high priority devices are continually up and running, thereby enabling continual service availability. The priority data may also indicate other appropriate priority levels and/or associated power down protocols.

In an example, based on the type of the shutdown event, the detection module 108 may analyze the identification data 212 to identify at least one computing device 202. For instance, in case the available backup power goes below a first threshold level, load shedding may be performed. Accordingly, the detection module 108 may identify the low priority devices using the priority data. Further, in case the available backup power goes below a second threshold level, a complete shutdown event may be detected, and the detection module 108 may identify all the computing devices 202 coupled to the auxiliary power supply unit using the downstream device information. Although two threshold levels have been discussed above, it will be appreciated that in various examples, the number of threshold levels may vary and accordingly one or more computing devices 202 to be shutdown may be identified.

Upon identifying the computing devices 202 to be shutdown, the device shutdown module 110 may generate a shutdown trigger, which may indicate to the computing devices 202 to perform a controller shutdown. The shutdown trigger may be provided to the identified computing devices 202. The shutdown trigger may be provided based on the port data 214. As will be understood, various devices may be coupled to the auxiliary power supply unit at various outlets and each outlet may have a unique port address. The information pertaining to which computing device is coupled to which port of the auxiliary power supply unit may be stored in the port data 214. Further, in certain cases there may be various intermediate power devices between the auxiliary power supply unit and an end computing device. In such cases, the port data 214 may include details of port addresses of the intermediate power devices as well. Further, certain intermediate power devices, such as power distribution units, may also have access to the port data 214.

In an example, the power control unit 102 may automatically map every device to a specific outlet to generate the port data 214. In said example, the outlets may be mapped based on identification information exchanged between the auxiliary power supply unit and the computing device 202. The identification information may be exchanged using a power outlet serial connection or a power line carrier data signal. The identification information may include data for devices provided in one or more levels below the auxiliary power supply unit. The identification information may include, for example, a unique identifier (UUID), a product name/type, a part number, a device name, a power supply slot number, a management processor IP address, a management processor IP port, a firmware version, an intelligent platform management interface (IPMI) Version, and/or an identity of redundant power sources. Further, the computing device 202 may also obtain identification information pertaining to corresponding single or redundant power sources.

Thus, based on outlet information available with the power control unit 102, the shutdown trigger may be provided to the identified computing device 202. In an example, based on the port data 214, the shutdown trigger may be directly addressed to an outlet of an intermediate power device, such as a power distribution unit, the outlet being coupled to the computing device 202 to be shutdown. In another example, the power control unit 102 may provide the shutdown trigger to a plurality of power distribution units to shutdown low priority devices, and each power distribution unit may in turn identify the computing devices 202 to be shutdown, based the priority data and the port data 214.

The shutdown trigger may be provided, for instance, to a remote management processor 218 corresponding to each of the computing devices 202 to be shutdown. For the sake of brevity, the remote management processor 218 has been illustrated in the computing device 202-1; however it will be understood that other computing devices 202-1 may also include the remote management processor 218. Examples of the remote management processor include, but are not limited to, a service processor, a baseboard management controller (BMC), a management processor, or an out-of-band control component. The remote management processor 218 may be understood to be a processor that runs independent of a main processor, i.e., processor 104 and an operating system of the computing device 202. Further, the remote management processor 218 allows for remote management capabilities, such as power management. Further, in the case of a non-server class device, such as a network switch, a network router, or a storage device, the remote management processor 218 and a corresponding operating system may be integrated.

In an example, the shutdown trigger may be provided to the remote management processor 218 over power cord data conductors. For instance, the shutdown trigger may be provided over an RS232 serial data cable, an RS485 cable, a controlled area network (CAN bus), or any other bus/cable, which may be attached to the power cord. In other examples, communication may be over power line carriers. The shutdown trigger may include outlet path from the auxiliary power supply unit to an end computing device to be shutdown. Accordingly, the shutdown trigger may be communicated through the outlets indicated in the outlet path to reach the computing device 202.

Further, the remote management processor 218 on receiving the shutdown trigger may command the operating system of the corresponding computing device 202 to shutdown. The shutdown command may be provided using protocols that support shutdown actions, such as advanced configuration and power interface (ACPI) protocol and intelligent platform management interface (IPMI). Also, since protocols such as ACPI are independent of the operating system of the computing device 202, the computing devices 202 may not install and maintain UPS agents for controlling the shutdown of the computing devices. Accordingly, the computing device 202 may perform a controlled shutdown to ensure data integrity.

In an example, the device shutdown module 110 may ascertain whether an identified computing device 202 is not responding to the shutdown trigger. For instance, if the identified computing device 202 continues to consume power even after receiving the shutdown trigger, it may be determined that the identified computing device 202 is not responding. In such cases, the device shutdown module 110 may power off the non-responsive device by turning off the power to the outlet corresponding to the non-responsive device. Thus, in case a low priority device is not responding it may reduce the power available for the high priority ones and a forced shutdown of such devices may provide for continuous functioning of the high priority devices. Thus, the present subject matter provides for controlled shutdown of the computing devices 202.

FIGS. 3a-3c illustrate various examples of the power control unit 102. For the sake of brevity, various components of the power control unit 102 are illustrated in FIGS. 3a-3c;

however it will be understood that the power control unit 102 may include the components discussed above.

Referring to FIG. 3a, a power control environment 302 is illustrated, according to an example of the present subject matter. As illustrated, an auxiliary power supply unit 304 may be coupled to the computing device 202. In said example, the power control unit 102 may be integrated with the auxiliary power supply unit 304. Thus, the auxiliary power supply unit 304, such as a UPS unit, may function as the power control unit 102 to control the shutdown of the computing device 202. Although no intermediate power devices have been illustrated, it will be understood that there may be one or more intermediate power devices, such as intelligent extension bars, for supplying power from the auxiliary power supply unit 304 to the computing device 202. In said example, information pertaining outlet port addresses of the intermediate power device connecting to the computing device may be stored in the port data 214. As mentioned before, the power control unit 102 may route the shutdown trigger based on the outlet path indicated by the port data 214 to the remote management processor corresponding to the computing device 202, for example, over RS232 serial cable.

FIG. 3b, illustrates a power control environment 306, according to another example of the present subject matter. Similar to the power control environment 302, the auxiliary power supply unit 304 may include the power control unit 102. As illustrated, the auxiliary power supply unit 304 may power the computing devices 202 though a power distribution unit 308. The power distribution unit 308 may be understood to be a device having multiple outlets designed to distribute power among the computing devices 202. In an example, the power control unit 102 may detect a shutdown event, based on the shutdown criterion. On detecting the shutdown event, the power control unit 102 may identify one or more of the computing devices 202 to be shutdown. For example, in case load shedding is to be done, based on the priority data, it may be determined that the computing device 202-1 is a low priority device while the computing device 202-n is a high priority one. Accordingly, based on the identification rules, the computing device 202-1 may be identified as the computing device to be shutdown.

Further, a shutdown trigger may be provided to a remote management processor of the computing device 202-1, while the computing device 202-n may continue functioning normally. In another example, if after shutting down the computing device 202-1, another shutdown event is detected, the computing device 202-n may be provided a shutdown trigger.

FIG. 3c illustrates a power control environment 310, according to an example of the present matter. In said example, an auxiliary power supply unit 312 provides power to one more computing devices 202 through a power distribution unit 314. In said example, the power distribution unit 314 may implement the power control unit 102. Thus, the power distribution unit 314 may monitor the auxiliary power supply unit 312 and detect a shutdown event. On detection of the shutdown event, the power distribution unit 314 may identify the computing devices 202 to be shutdown and may provide a shutdown trigger to the identified computing devices 202.

Figure 4:
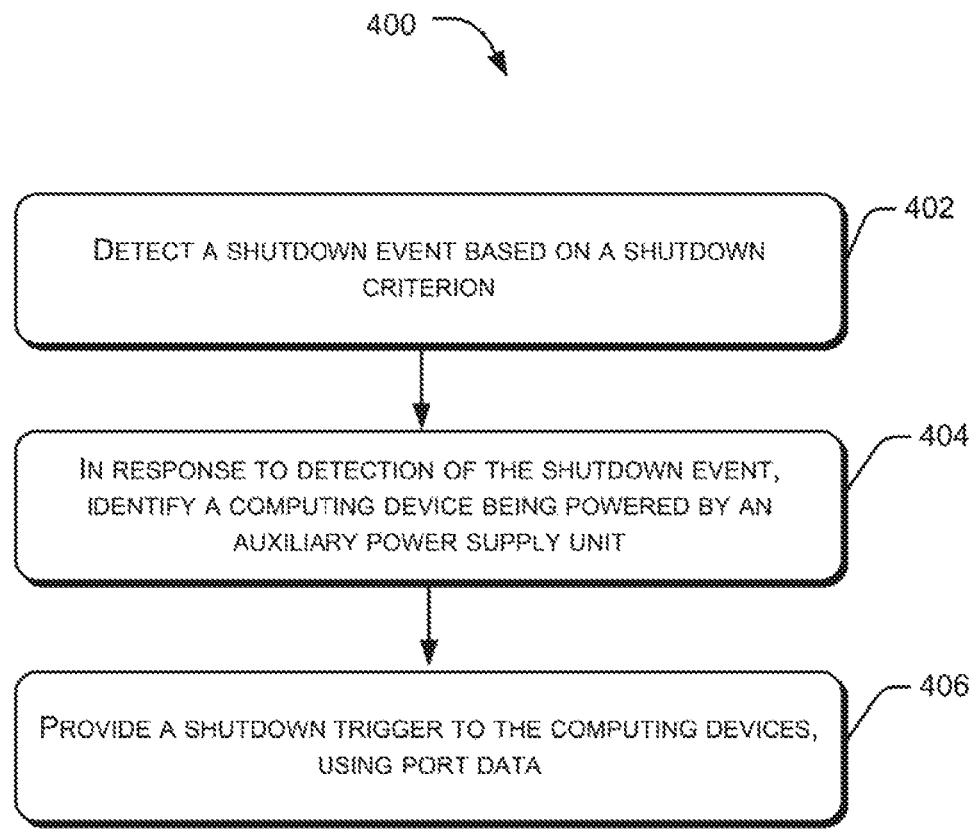
FIG. 4 illustrates a method for controlling shutdown of computing devices, according to an example of the present subject matter.
Figure 5:
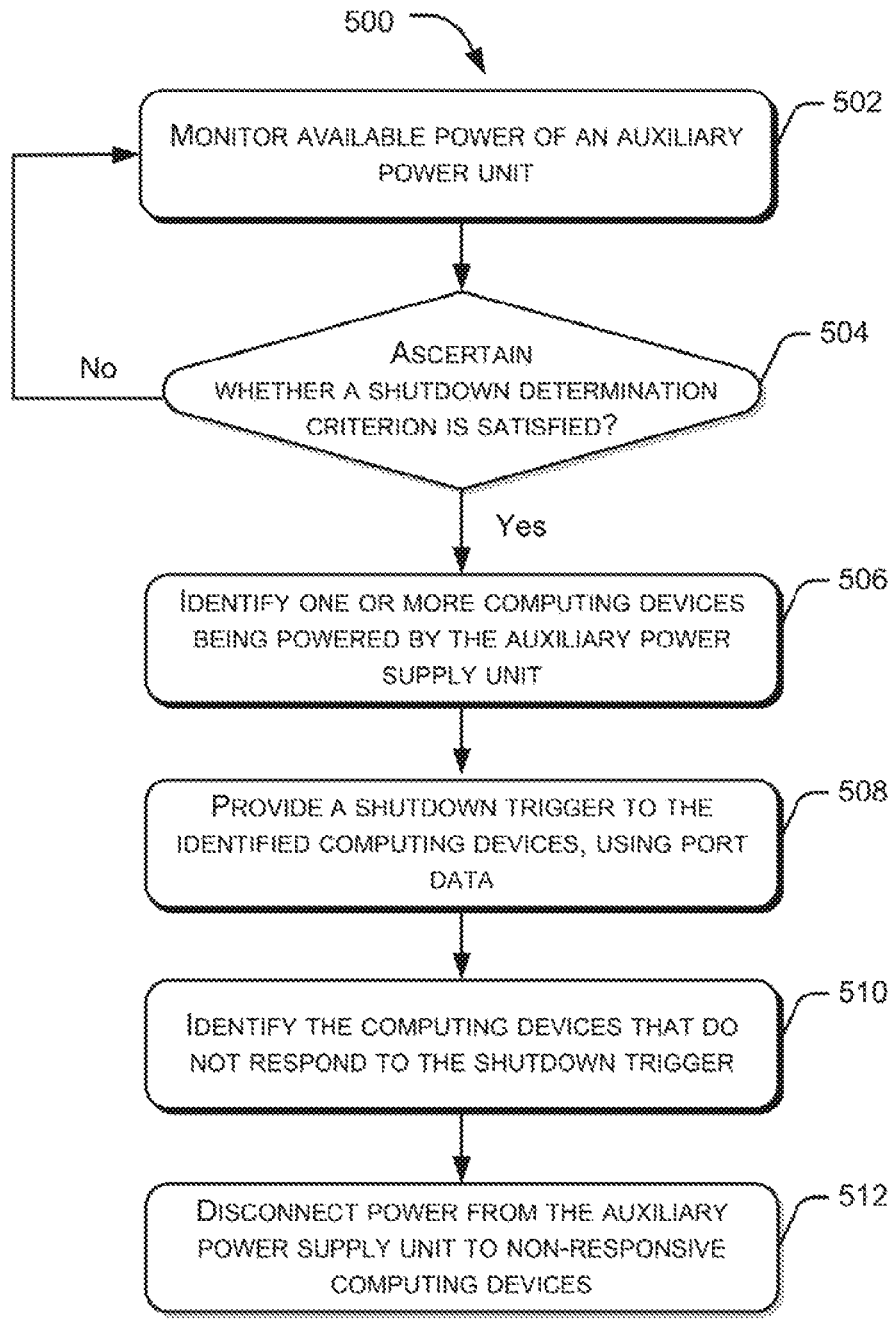
FIG. 5 illustrates a method for controlling shutdown of computing devices, according to another example of the present subject matter

Methods 400 and 500 are described in FIG. 4 and FIG. 5, respectively, for controlling shutdown of computing devices, such as the computing devices 202 according to an example of the present subject matter.

The order in which the methods 400 and 500 are described is not intended to be construed as a limitation, and any number of the described method blocks can be combined in any appropriate order to implement the methods 400 and 500 or an alternative method. Additionally, individual blocks may be deleted from the methods 400 and 500 without departing from the spirit and scope of the subject matter described herein. Furthermore, the methods 400 and 500 can be implemented in any suitable hardware, software, firmware, or combination thereof.

It would be understood that the methods 400 and 500 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 4, the method 400 may be performed by a computing unit, such as the power control unit 102.

At block 402, a shutdown event based on a shutdown criterion may be detected. The shutdown criterion may be based on available backup power of an auxiliary power supply unit. In an example, the shutdown event may be detected by the detection module 108.

At block 404, in response to detection of the shutdown event, a computing device coupled to the auxiliary power supply unit may be identified. The computing device may be identified based on identification data. In an example, the computing device may be identified by the detection module 108.

At block 406, a shutdown trigger may be provided to the computing device using port data. The shutdown trigger may include port addresses of one or more downstream devices in an outlet path of the auxiliary power supply unit and the at least one computing device. In an example, the shutdown trigger may be provided by the device shutdown module 110.

Referring to FIG. 5, the method 500 may be performed by a computing unit, such as the power control unit 102.

At block 502, an auxiliary power supply unit is monitored to determine available backup power of the auxiliary power supply unit. In an example, the auxiliary power supply unit may be monitored by the detection module 108.

At block 504, it is ascertained whether a shutdown criterion is satisfied. The shutdown criterion may be based on the available backup power. In an example, if it is ascertained that the available power is not below a threshold level, it may be determined that shutdown criterion is not satisfied and the method 500 may branch ('No' branch) back to block 502. However, if it is ascertained that the available power is below a threshold level, it may be determined that shutdown criterion is satisfied and a shutdown event has occurred. In said case, the method 500 may proceed to ('Yes' branch) block 506.

At block 506, one or more computing devices being powered by the auxiliary power supply unit are identified. The computing devices may be identified using identification data. The identification data may include priority data and downstream device information and may aid in identification of the computing devices, based on a type of shutdown event. In an example, the computing devices may be identified by the detection module 108.

At block 508, a shutdown trigger may be provided to the identified computing devices using port data. The port data may aid identification of an outlet path corresponding to the identified computing device and the shutdown trigger may be provided to the computing device based on the outlet path. In an example, the shutdown trigger may be provided to a remote management processor of each of the identified computing device. In an example, the shutdown trigger may be provided by the device shutdown module 110.

At block 510, the computing devices that do not respond to the shutdown trigger are identified. For example, it may be ascertained whether any of the above identified computing devices is not responding to the shutdown trigger. If it is ascertained all the identified computing devices have responded to the shutdown trigger no further action may be taken. In an example, the non-responsive devices may be identified by the device shutdown module 110.

At block 512, power from the auxiliary power supply unit to non-responding computing devices is disconnected to perform a forced shutdown of the non-responsive devices.

Figure 6:
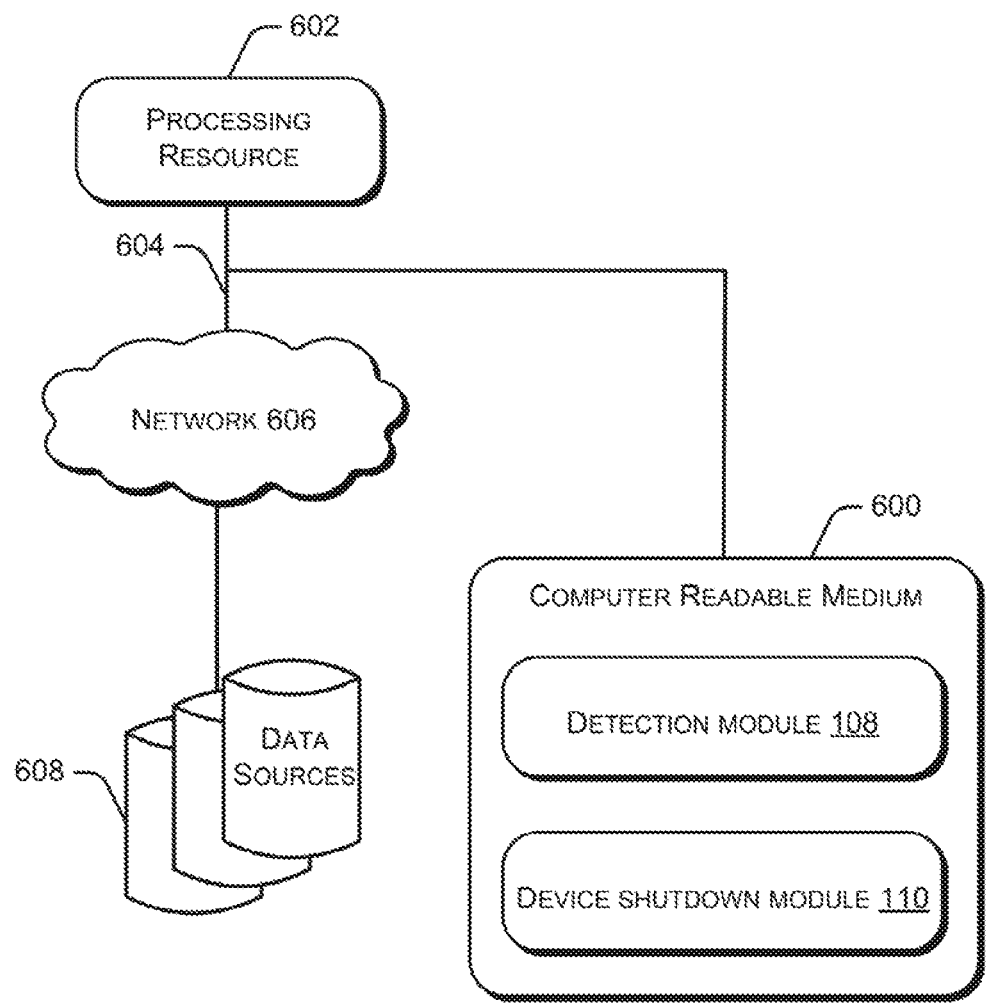
FIG. 6 illustrates a computer readable medium storing instructions to perform controlled shutdown of computing devices, according to an example of the present subject matter.

FIG. 6 illustrates a computer readable medium 600 storing instructions for controlling shutdown of computing devices, according to an example of the present subject matter. In one example, the computer readable medium 600 is communicatively coupled to a processing resource 602 over a communication link 604.

For example, the processing resource 602 can be a computing device, such as a server, a laptop, a desktop, a mobile device, and the like. The computer readable medium 600 can be, for example, an internal memory device or an external memory device or any commercially available non transitory computer readable medium. In one example, the communication link 604 may be a direct communication link, such as any appropriate memory read/write interface. In another example, the communication link 604 may be an indirect communication link, such as a network interface. In such a case, the processing resource 602 can access the computer readable medium 600 through a network 606. The network 606 may be a single network or a combination of multiple networks and may use a variety of different communication protocols.

The processing resource 602 and the computer readable medium 600 may also be communicatively coupled to data sources 608 over the network. The data sources 608 can include, for example, databases and computing devices. The data sources 608 may be used by the requesters and the agents to communicate with the processing resource 602.

In one example, the computer readable medium 600 includes a set of computer readable instructions, such as the detection module 108 and the device shutdown module 110. The set of computer readable instructions can be accessed by the processing resource 602 through the communication link 604 and subsequently executed to perform acts for controlling shutdown of the computing devices 202.

On execution by the processing resource 602, the detection module 108 may ascertain whether a shutdown criterion is satisfied and detect occurrence of a shutdown event when the shutdown criterion is satisfied. The shutdown event may be based on available power of an auxiliary power supply unit coupled to one or more computing devices. On detection of a shutdown event, at least one computing device to be shutdown may be identified based on identification data.

Further, the device shutdown module 110 may provide a shutdown trigger indicating to a remote management processor of the at least one computing device to shutdown, based on port data. The shutdown trigger may include port addresses of one or more downstream devices coupled to the auxiliary power supply unit.

Although implementations for controlled shutdown of computing devices have been described in language specific to structural features and/or methods, it is to be understood that the appended claims are not necessarily limited to the specific features or methods described. Rather, the specific features and methods are disclosed as example implementations for controlling shutdown of computing devices.

We claim:

1. A power control unit comprising:
a processor;
a non-transitory computer-readable medium having executable instructions stored thereon that, when executed by the processor, cause the processor to perform operations of:
detecting a shutdown event based on a shutdown criterion, the shutdown criterion being based on available backup power of an auxiliary power supply unit;
generating, in response to detection of the shutdown event, a shutdown trigger to initiate shutdown of a computing device powered by the auxiliary power supply unit before the auxiliary power supply unit runs out of power; and
providing the shutdown trigger to a remote management processor of the computing device using a power line communication, the shutdown trigger being provided based on port data, the port data indicating an outlet path from the auxiliary power supply unit to the computing device, wherein the power control unit is integrated with one of the auxiliary power supply unit or a power distribution unit that distributes power to the computing device.

2. The power control unit as claimed in claim 1, wherein the instructions when executed by the processor, cause the processor to further perform an operation of: in response to detecting the shutdown event, identifying the computing device to be shutdown based on identification data.

3. The power control unit as claimed in claim 1, wherein the instructions when executed by the processor, cause the processor to further perform operations of:
ascertaining whether the computing device is responsive to the shutdown trigger; and
when the computing device is non-responsive to the shutdown trigger, disconnecting power supply to the computing device.

4. The power control unit as claimed in claim 1, wherein the instructions when executed by the processor, cause the processor to further perform an operation of: routing the shutdown trigger through a port of the auxiliary power supply unit, indicated by the outlet path.

5. The power control unit as claimed in claim 1, wherein the auxiliary power supply unit includes a redundant power source.

6. The power control unit of claim 1, wherein the power line communication comprises a power line carrier data signal to provide the shutdown trigger.

7. The power control unit of claim 1, wherein the power line communication comprises a power cord to provide the shutdown trigger.

8. The power control unit of claim 1, wherein the remote management processor on receiving the shutdown trigger is configured to command an operating system of the computing device to shutdown, wherein the shutdown trigger is provided using a protocol that supports shutdown actions independent of an operating system of a computing device.

9. The power control unit of claim 1, wherein the port data identifies which outlet of a power distribution unit or the auxiliary power supply unit the computing device is coupled to.

10. A computer implemented method comprising:
- detecting, by a power control unit, a shutdown event based on a shutdown criterion, the shutdown criterion being based on available backup power of an auxiliary power supply unit;
- in response to detection of the shutdown event, identifying, by the power control unit, a computing device to be shutdown, based on identification data, the computing device being coupled to the auxiliary power supply unit; and
- providing, by the power control unit, a shutdown trigger to the computing device using port data before the auxiliary power supply unit runs out of power, wherein the shutdown trigger is provided using a power line communication, wherein the power control unit is integrated with one of the auxiliary power supply unit or a power distribution unit that distributes power to the computing device.

11. The method as claimed in claim 10, wherein the identifying comprises determining, by a power control unit, the computing device based on priority data indicating the computing device as a low priority device.

12. The method as claimed in claim 10, wherein the providing further comprises sending the shutdown trigger to the power distribution unit coupling the computing device to the auxiliary power supply unit.

13. The method as claimed in claim 10, wherein the shutdown criterion includes a check to determine whether the available backup power of the auxiliary power supply unit that is powering the computing device falls below a threshold level.

14. A non-transitory computer-readable medium comprising instructions executable by a processor to:
- identify a computing device to be shutdown in response to detection of a shutdown event, the computing device being identified based on identification data, wherein the shutdown event is based on available backup power of an auxiliary power supply unit coupled to the computing device; and
- provide a shutdown trigger to the computing device using a power line communication to initiate shutdown of the computing device before the auxiliary power supply unit runs out of power, wherein the shutdown trigger is provided by the auxiliary power supply unit or a power distribution unit that distributes power to the computing device.

15. The non-transitory computer-readable medium as claimed in claim 14, wherein the non-transitory computer-readable further comprises instructions executable by the processor to:
- ascertain whether a shutdown criterion is satisfied, the shutdown criterion being based on a threshold level of the available backup power; and
- detect occurrence of a shutdown event in response to the shutdown criterion being satisfied.

16. The non-transitory computer-readable medium as claimed in claim 14, wherein the shutdown trigger includes output addresses of a downstream device coupled to the auxiliary power supply unit.

17. The non-transitory computer-readable medium as claimed in claim 14, wherein the identification of the computing device to be shutdown is based on a type of the shutdown event.

* * * * *